(12) United States Patent
Won (10) Patent No.: US 12,505,264 B2
(45) Date of Patent: Dec. 23, 2025

(54) SEMICONDUCTOR FACILITY LAYOUT SIMULATION METHOD, COMPUTER SYSTEM AND NON-TRANSITORY COMPUTER READABLE MEDIUM

(71) Applicant: SEMES CO., LTD., Cheonan-si (KR)

(72) Inventor: Hye Jin Won, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 1020 days.

(21) Appl. No.: 17/533,335

(22) Filed: Nov. 23, 2021

(65) Prior Publication Data

US 2022/0164508 A1    May 26, 2022

(30) Foreign Application Priority Data

Nov. 23, 2020    (KR) .................. 10-2020-0158155

(51) Int. Cl.
*G06F 30/13* (2020.01)
*G05B 19/418* (2006.01)

(52) U.S. Cl.
CPC ....... *G06F 30/13* (2020.01); *G05B 19/41885* (2013.01)

(58) Field of Classification Search
CPC ...... G06F 30/3308; G06F 30/18; G06F 30/20; G06F 30/13; G06F 30/392; G06F 30/398; G06F 2119/18; G05B 19/41885
See application file for complete search history.

(56) References Cited

U.S. PATENT DOCUMENTS

| | | | |
|---|---|---|---|
| 8,179,323 | B2 | 5/2012 | Shamblin et al. |
| 8,229,587 | B2 * | 7/2012 | Shieh ............... G05B 19/41885 |
| | | | 700/95 |
| 9,425,501 | B2 | 8/2016 | Desclos et al. |
| 2009/0229108 | A1 | 9/2009 | Shamblin et al. |
| 2010/0023151 | A1 | 1/2010 | Shieh et al. |

FOREIGN PATENT DOCUMENTS

| | | |
|---|---|---|
| CN | 101978389 | 7/2014 |
| EP | 2248099 | 4/2019 |
| JP | 10-232889 | 9/1998 |
| JP | 5339096 | 8/2013 |
| KR | 1020010078512 | 8/2001 |
| KR | 10-1185796 | 9/2012 |
| KR | 1020160099250 | 8/2016 |

(Continued)

OTHER PUBLICATIONS

Kim et al., Semiconductor FAB layout design analysis with 300-mm FAB data: [retrieved on Feb. 12, 2025]. Retrieved from the Internet: < URL: https://www.sciencedirect.com/science/article/pii/S0360835216300390?_cf_chl_tk=rNZGaDYfVnT1262KiJe8YTQ8hALaL7DoWOSTsl8r1SM-1739389978-1.0.1.1-8O3MwGn9 (Year: 2016).*

(Continued)

*Primary Examiner* — Rehana Perveen
*Assistant Examiner* — John David Hagler (57) ABSTRACT

In a computer system including a processor; and a memory storing a program code executable by the processor, wherein the processor performs steps of laying out facilities disposed in a semiconductor FAB through a first layout method or a second layout method and simulating a result according to the layout method; and comparing the simulated result through various parameters.

8 Claims, 10 Drawing Sheets

(56) References Cited

FOREIGN PATENT DOCUMENTS

| | | |
|---|---|---|
| TW | I416429 | 11/2013 |
| WO | 2009-105724 | 8/2009 |
| WO | 2010-071687 | 6/2010 |

OTHER PUBLICATIONS

1 Office Action from the Korean Intellectual Property Office dated Sep. 28, 2022.
Kim, J., Yu, G., & Jang, Y. J. (2016). Semiconductor FAB layout design analysis with 300-mm FAB data: Is minimum distance-based layout design best for semiconductor FAB design? Computers & Industrial Engineering, 99, 330-346.

\* cited by examiner

| Settings | Layout(Square) | Layout(zigzag) | UPEH, WPD | WPPS | Trend | | | *OHT=Overhead Time | Edit Input |
|---|---|---|---|---|---|---|---|---|---|
| UPEH Factor | | | | | | | | | |
| Item | | | Cluster8 6PM | Inline 6PM | Inline 10PM | Cluster-6 3P... | Inline 4PM | | |
| Chamber Count | | | | | | | | | |
| PM Process Time-ISD Time | | | | | | | | | |
| Transfer Time | | | | | | | | | |
| Gate Action Time(Open/Close) | | | | | | | | | |
| Process Time per PM | | | | | | | | | |
| Exchange Time | | | | | | | | | |
| Exchange Time per PM | | | | | | | | | |
| | | | | | | | | | |
| UPEH Result >>> | | | | | | | | | |
| Item | | | Cluster8 6PM | Inline 6PM | Inline 10PM | Cluster-6 3P... | Inline 4PM | | |
| OHT | | | | | | | | | |
| UPEH | | | | | | | | | |
| WPD | | | | | | | | | |
| 1 PM UPEH | | | | | | | | | |
| 1 PM WPD | | | | | | | | | |

FIG. 4

| Settings | Layout(Square) | Layout(zigzag) | UPEH, WPD | WPPS | Trend |

WPPS Factor

| Item | EQP | Cluster8 6PM | Inline 6PM | Inline 10PM | Cluster-6 3P... | Inline 4PM |
|---|---|---|---|---|---|---|
| 1 PM WPD | | | | | | |
| WPD | | | | | | |
| System Space | | | | | | |
| Chamber Space | | | | | | |
| Price Ratio | | | | | | |

WPPS Result >>>   View Square 120 Chm   View Zigzag 120 Chm

| Item | EQP | Cluster8 6PM | Inline 6PM | Inline 10PM | Cluster-6 3P... | Inline 4PM |
|---|---|---|---|---|---|---|
| WPPS | | | | | | |
| WPPS Efficiency | | | | | | |
| Space(120 Chm) | | | | | | |
| Space Efficiency(120 Chm) | | | | | | |

SEMICONDUCTOR FACILITY LAYOUT SIMULATION METHOD, COMPUTER SYSTEM AND NON-TRANSITORY COMPUTER READABLE MEDIUM

CROSS-REFERENCE TO RELATED APPLICATIONS

This application claims priority to and the benefit of the Korean Patent Application No. 10-2020-0158155 filed in the Korean Intellectual Property Office on Nov. 23, 2020, the entire contents of which are incorporated herein by reference.

TECHNICAL FIELD

The present invention relates to a semiconductor facility layout simulation method, a computer system, and a non-transitory computer readable medium.

BACKGROUND ART

In the related art, when semiconductor facilities were laid out, a design was laid out manually, and the calculation of the production is performed by using a manually preparing and deriving method, and thus, it was difficult to analyze the tendency of production change. In addition, in the case of calculating the production by adding a new facility type other than the existing facility, it is difficult to calculate the production without a simulation tool capable of applying the calculation.

SUMMARY OF THE INVENTION

The present invention has been made in an effort to provide a system capable of providing, comparing, and analyzing a simulation result according to a semiconductor facility layout method.

The problem to be solved by the present invention is not limited to the above-mentioned problems. The problems not mentioned will be clearly understood by those skilled in the art from the present specification and the accompanying drawings.

A exemplary embodiment of the present invention provides a computer system including a processor; and a memory storing a program code executable by the processor.

The processor may perform steps of laying out facilities disposed in a semiconductor FAB through a first layout method or a second layout method and simulating a result according to the layout method, and comparing the simulated result through various parameters.

In the exemplary embodiment, the processor may perform the simulation by receiving sizes, processing times, transmission times, etc. of the facilities disposed in the semiconductor FAB.

In the exemplary embodiment, the processor may perform the simulation by receiving the size of the semiconductor FAB.

In the exemplary embodiment, the processor may compare a production per day or a production per hour of the facilities disposed in the semiconductor FAB.

In the exemplary embodiment, the processor may compare a production to space and price of the semiconductor FAB.

In the exemplary embodiment, the processor may compare a production per day or a production per hour of the facilities in a down situation of transfer modules or processing modules in the facilities disposed in the semiconductor FAB.

In the exemplary embodiment, the processor may performs visually datalizing the production per day or the production per hour according to a change in processing time through a chart or table.

In the exemplary embodiment, the first layout method may be a method of laying out facilities at both sides to face each other with a passage interposed therebetween in the semiconductor FAB, and the second layout method may be a method of laying out the facilities in a zigzag form without a space in the semiconductor FAB.

Another exemplary embodiment of the present invention provides a non-transitory computer readable medium for storing a program code executable by a processor.

Yet another exemplary embodiment of the present invention provides a method of performing a semiconductor facility layout simulation using a computer system.

The method may include steps of determining a layout method of facilities disposed in a semiconductor FAB; inputting sizes, processing times, transmission times, etc. of the facilities disposed in the semiconductor FAB; performing a simulation based on the input values; and visualizing and displaying a result of performing the simulation.

In the exemplary embodiment, in the determining of the layout method of the facilities disposed in the semiconductor FAB, any one of a first layout method of laying out facilities at both sides to face each other with a passage interposed therebetween in the semiconductor FAB and a second layout method of laying out the facilities in a zigzag form without a space in the semiconductor FAB may be determined.

In the exemplary embodiment, in the inputting of the sizes, processing times, transmission times, etc. of the facilities disposed in the semiconductor FAB, the size of the semiconductor FAB may be input together.

In the exemplary embodiment, the visualizing of the performed result may be visualizing and displaying a result of a production per day or a production per hour of the facilities disposed in the semiconductor FAB.

In the exemplary embodiment, the visualizing of the performed result may be visualizing and displaying a result of a production to space and price of the semiconductor FAB.

In the exemplary embodiment, the visualizing of the performed result may be visualizing and displaying a result of a production per day or a production per hour of the facilities in a down situation of transfer modules or processing modules in the facilities disposed in the semiconductor facilities.

According to the present invention, it is possible to analyze the efficiency according to the facility layout method in the semiconductor.

The effect of the present invention is not limited to the foregoing effects. Non-mentioned effects will be clearly understood by those skilled in the art from the present specification and the accompanying drawings.

DETAILED DESCRIPTION

Hereinafter, an exemplary embodiment of the present invention will be described more fully hereinafter with reference to the accompanying drawings, in which exemplary embodiments of the invention are shown. However, the present invention can be variously implemented and is not limited to the following embodiments. In the following description of the present invention, a detailed description of known functions and configurations incorporated herein is omitted to avoid making the subject matter of the present invention unclear. In addition, the same reference numerals are used throughout the drawings for parts having similar functions and actions.

Unless explicitly described to the contrary, the word "include" and variations such as "includes" or "including" will be understood to imply the inclusion of stated elements but not the exclusion of any other elements. It will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Singular expressions used herein include plurals expressions unless they have definitely opposite meanings in the context. Accordingly, shapes, sizes, and the like of the elements in the drawing may be exaggerated for clearer description.

Figure 1:
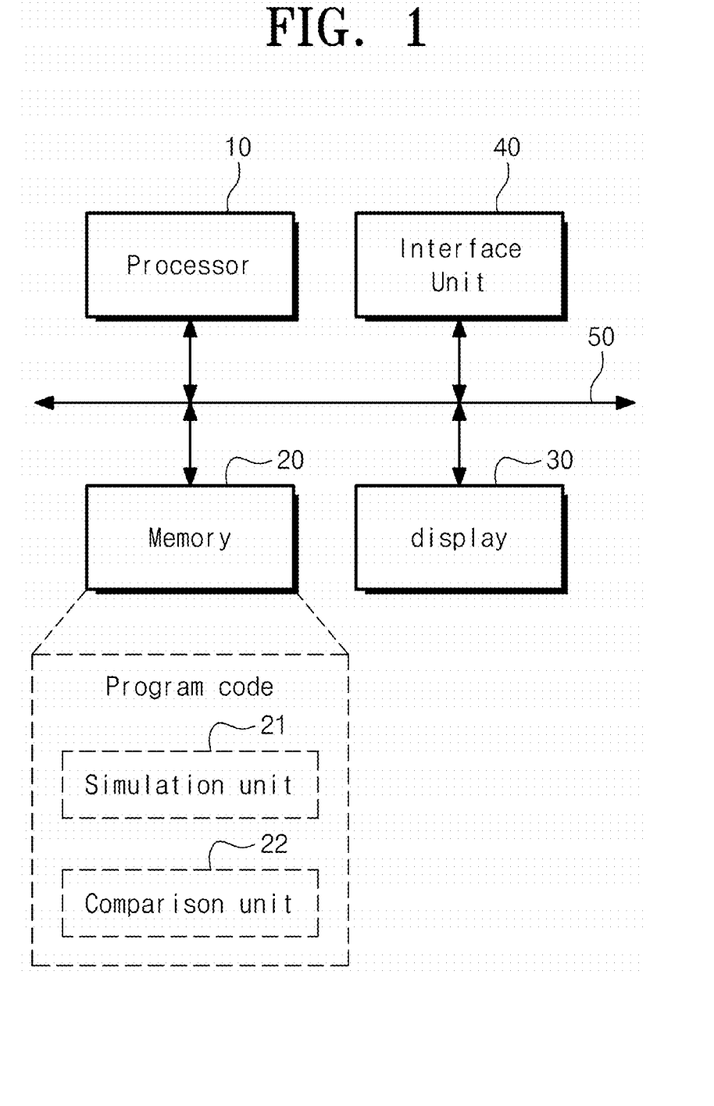
FIG. 1 is a block diagram illustrating a computer system capable of performing a semiconductor facility layout simulation according to an exemplary embodiment of the present invention.

FIG. 1 is a block diagram illustrating a computer system capable of performing a semiconductor facility layout simulation according to an exemplary embodiment of the present invention.

A simulation method to be described below may be performed by a computer device. The computer device may include at least one of a computer, a workstation, a server, a desktop PC, a netbook, a smart phone, a tablet PC, a mobile phone, a video phone, an e-book reader, a PDA, a PMP, an MP3 player, a medical device, an electronic device, and a wearable device. In addition, the computer device may be implemented in a centralized data storage environment, or may be implemented in a distributed data storage environment.

FIG. 1 is a block diagram for describing a simulation device according to some exemplary embodiments of the present invention. FIG. 1 illustrates an exemplary computing device or non-transitory computer readable medium for performing a simulation method to be described using FIGS. 3 to 9.

Referring to FIG. 1, a simulation device 1 according to some exemplary embodiments of the present invention may include a processor 10, a memory 20, a display 30, an interface unit 40, a bus 50, and the like.

By the bus 50, various components such as the processor 10, the memory 20, the display 30, and the interface unit 40, and the like may be connected and communicate (i.e., control message transmission and data transmission) with each other.

The processor 10 may include one or more of a central processing unit, an application processor, and a communication processor (CP). The processor 10 may perform, for example, an operation or data processing for the control and/or communication of at least one other components of the computing device or the non-transitory computer readable medium.

The memory 20 may include a volatile memory (e.g., DRAM, SRAM, or SDRAM) and/or a nonvolatile memory (e.g., one time programmable ROM (OTPROM), PROM, EPROM, EEPROM, mask ROM, flash ROM, flash memory, PRAM, RRAM, MRAM, hard drive, or solid state drive (SSD)). The memory 20 may include an internal memory and/or an external memory. The memory 20 may store, for example, instructions or data related to at least one other component of an electronic device. In addition, the memory 20 may store software and/or programs. The program may include, for example, kernel, middleware, an application programming interface (API), and/or an application program (or "application"). At least a portion of the kernel, the middleware, or the API may be referred to as an operating system.

The memory 20 stores instructions for performing a simulation method to be described below.

On the other hand, there may be provided a non-transitory computer readable medium stored with a program of sequentially performing the simulation method according to some exemplary embodiments of the present invention. The non-transitory computer readable medium means a medium that semi-permanently stores data therein and is readable by a computer, not a medium that stores data therein for a short moment, such as a register, a cache, a memory, or the like. Specifically, various applications or programs described above may be stored and provided in the non-transitory computer readable medium, such as a CD, a DVD, a hard disk, a Blu-ray disk, a USB, a memory card, a ROM, or the like.

The display 30 may include, for example, a liquid crystal display (LCD), a light emitting diode (LED) display, an organic light emitting diode (OLED) display, a microelectronic machine system (MEMS) display, or an electronic paper display. The display 30 may display, for example, various contents (e.g., texts, images, videos, icons, and/or symbols, etc.) to the user. The display 30 may include a touch screen, and for example, may receive a touch, a gesture, a proximity, or a hovering input using an electronic pen or a part of a user's body.

The interface unit 40 may allow the computing device to communicate with the outside via a network. Here, the network includes both wired and wireless methods. In particular, the wireless communication may include, for example, an LTE, an LTE advance (LTE-A), a code division multiple access (CDMA), a wideband CDMA (WCDMA), a universal mobile telecommunications system (UMTS), a wireless broadband (WiBro), or a global system for mobile communications (GSM), etc. Alternatively, the wireless communication may include at least one of wireless fidelity (WiFi), light fidelity (LiFi), Bluetooth, Bluetooth low energy (BLE), Zigbee, near field communication (NFC), magnetic secure transmission, radio frequency (RF), or body area network (BAN). Alternatively, the wireless communication may include GNSS. The GNSS may be, for example, a global positioning system (GPS), a global navigation satellite system (Glonass), a Beidou navigation satellite system (hereinafter, "Beidou") or Galileo, and a European global satellite-based navigation system. The wired communication may include, for example, at least one of universal serial bus (USB), high definition multimedia interface (HDMI), recommended standard 232 (RS-232), powerline communications, or plain old telephone service (POTS), computer networks (such as LAN or WAN), etc.

According to the memory 20 according to an exemplary embodiment of the present invention, a simulation unit 21 and a comparison unit 22 may be included. The simulation unit 21 according to the present invention may lay out facilities disposed in a semiconductor FAB through a first layout method or a second layout method, and simulate the result according to the layout method. The comparison unit 22 according to the present invention may compare and visualize the result simulated by the simulation unit 21 through various parameters.

The semiconductor facility layout simulation according to the present invention has an effect of confirming the productivity according to a layout method or various conditions of facilities by performing a layout method of semiconductor facilities in a predetermined size and performing the simulation by applying values of the size, processing time, and the like of the laid-out semiconductor facilities directly input by the user.

The simulation unit 21 according to the present invention may perform the simulation by receiving various values. According to an exemplary embodiment, the simulation unit 21 may receive values of the size, processing time, transmission time, and the like of facilities disposed in the semiconductor FAB to perform the simulation. According to another exemplary embodiment, the simulation unit 21 may perform the simulation by receiving the size of the semiconductor FAB.

The simulation unit 21 according to the present invention may lay out the facilities by selecting either a first layout method or a second layout method and perform the simulation. The simulation unit 21 according to another exemplary embodiment of the present invention may perform the simulation according to each of the first layout method and the second layout method and transmit the simulation result according to each layout method to the comparison unit to compare the results for each parameter. A detailed matter for the first layout method and the second layout method will be described below using FIG. 2.

The comparison unit 22 according to the present invention may compare and visualize the results simulated by the simulation unit 21 through various parameters. The parameters of comparing the simulation results in the comparison unit 22 may be a wafer production per day (WPD) of the facilities disposed in the semiconductor FAB. The parameters of comparing the simulation results in the comparison unit 22 may be a unit per equipment hour (UPEH) of the facilities disposed in the semiconductor FAB.

According to another exemplary embodiment of the present invention, the parameters of comparing the simulation results in the comparison unit 22 may be a wafer production to space and price (WPPS) of the semiconductor FAB.

That is, the comparison unit 22 according to the present invention compares production results for various layout structures simulated by the simulation unit 21, thereby determining an optimal layout structure.

According to another exemplary embodiment of the present invention, the comparison unit 22 may compare a production per day or production per hour of the facility in a down situation of transfer modules or processing modules in the semiconductor facilities. When it is assumed that the down situation of transfer modules or processing modules in the semiconductor facilities occurs, the simulation unit 21 may input the number of loss wafers in the downed situation and the comparison unit 22 may output a production reflecting the input number of loss wafers and compare the output production in a visualized form.

Further, according to the present invention, the comparison unit 22 has an effect of displaying various production parameter results in a graph form or a table form according to a change in processing time to visualize the production parameter results. As a result, there is an effect of more convenient comparison of the user.

A processing method of the simulation unit 21 and the comparison unit 22 described above may be stored in the memory 20 storing program codes executable by the processor 10.

Hereinafter, a semiconductor facility layout simulation method according to the present invention using actual simulation results will be described in more detail.

Figure 2A:
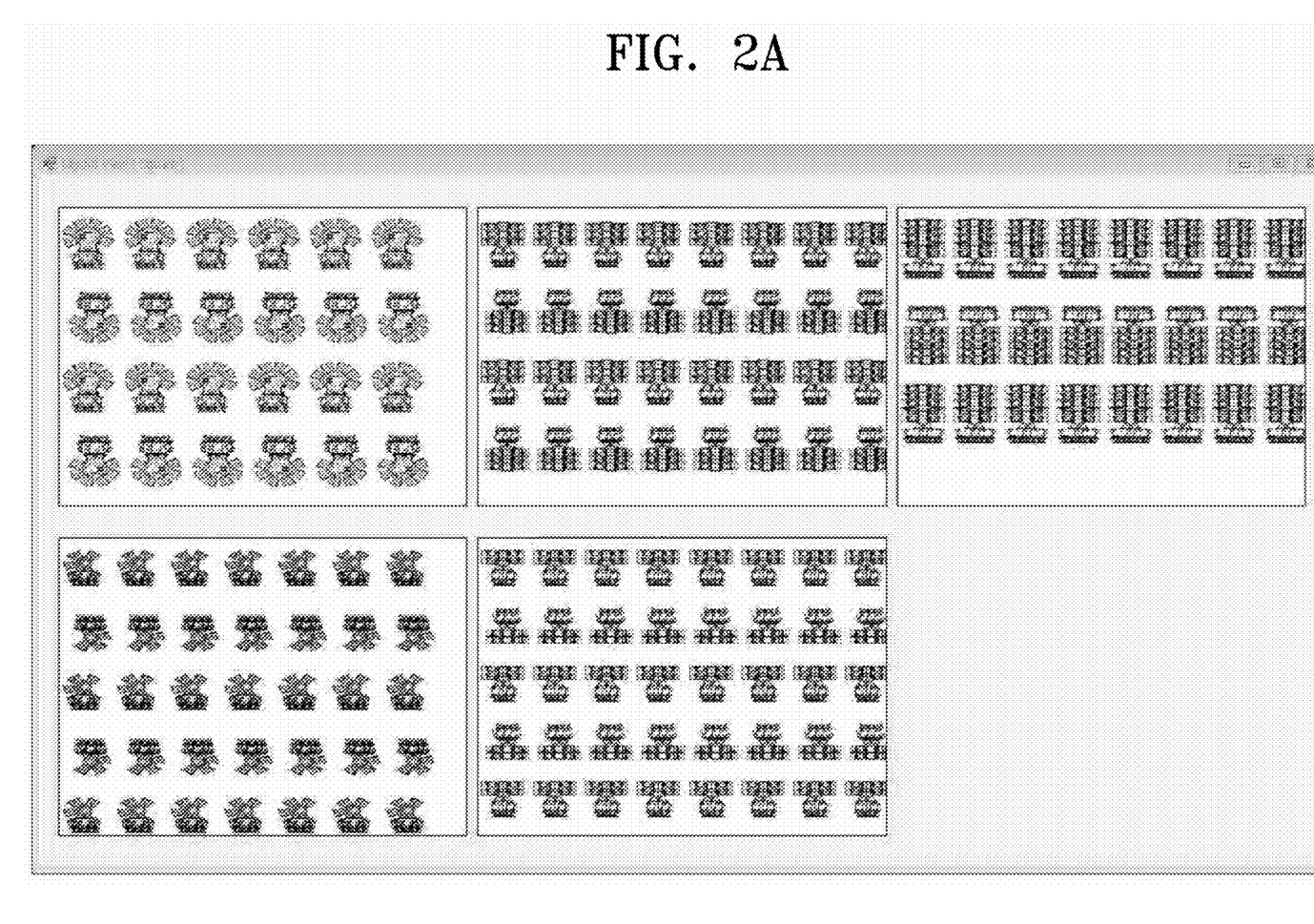
FIGS. 2A and 2B are diagrams for describing a semiconductor facility layout method according to an exemplary embodiment of the present invention, respectively.
Figure 2B:
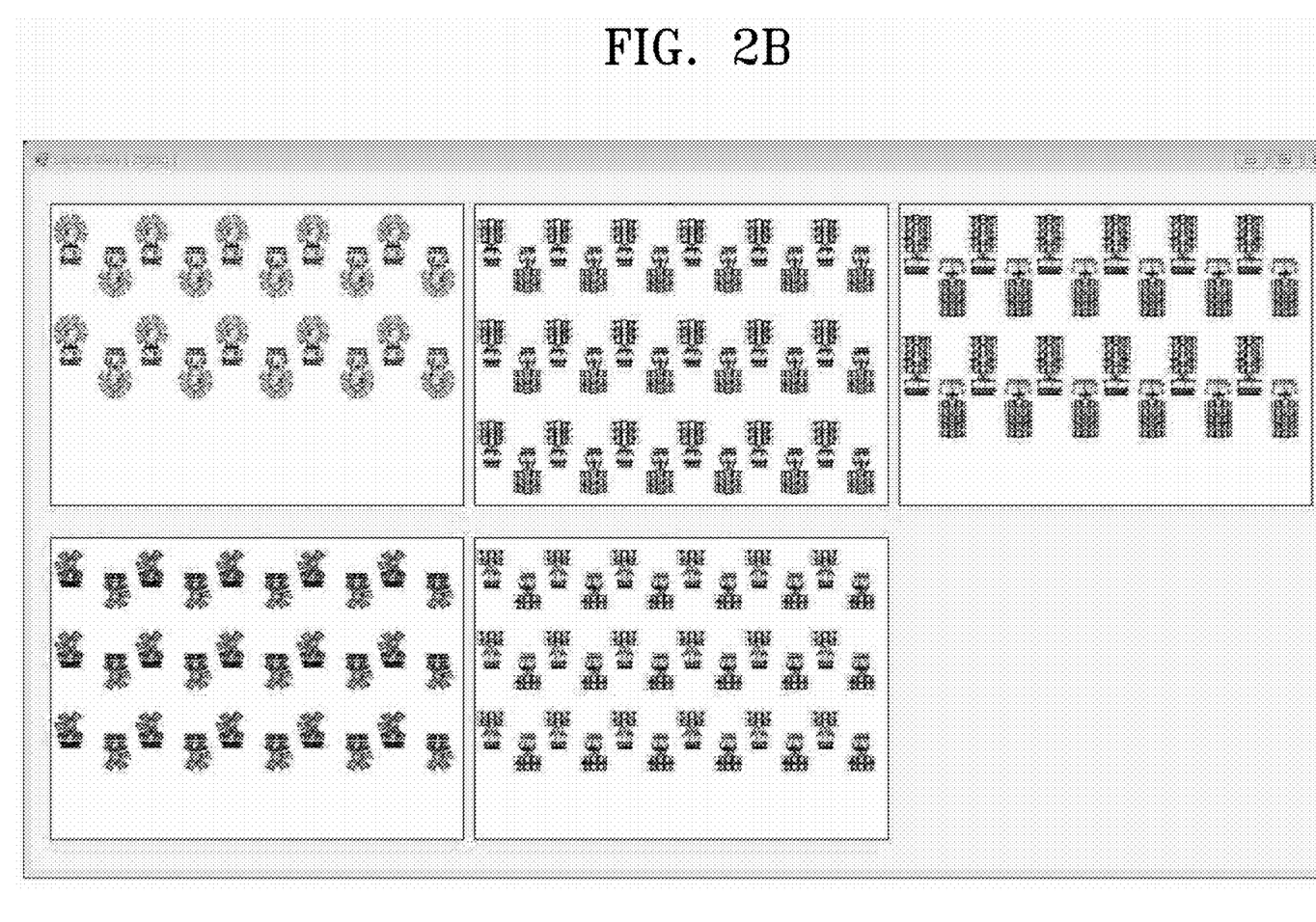

FIGS. 2A and 2B are diagrams for describing a semiconductor facility layout method according to an exemplary embodiment of the present invention, respectively.

FIG. 2A illustrates a first layout method and FIG. 2B illustrates a second layout method.

The first layout method means a method of laying out facilities at both sides to face each other with a passage interposed therebetween in the semiconductor FAB. The second layout method means a method of laying out the facilities in a zigzag form without a space in the semiconductor FAB.

FIG. 2A illustrates a conventional layout method, and FIG. 2B illustrates a layout method newly proposed in the present invention. According to FIG. 2A, the conventional layout method follows a general facility layout method. It may be confirmed that the facilities are laid out on both sides to face each other horizontally with a passage through which persons pass. Referring to FIG. 2B, it may be confirmed that the facilities do not face each other on both sides based on EFEM and compressively laid out without a space. According to an exemplary embodiment of FIG. 2B, the facilities may be laid out in a zigzag form.

Since the layout number of semiconductor facilities vary according to which form semiconductor facilities are laid out in a limited space in the FAB and the facility production and spatial efficiency vary, the production varies according to how the layout method is selected and a need to compare the production is required. Therefore, in the present invention, two layout methods are selected to compare and analyze the production according to each layout method.

According to the present invention, simultaneous comparison of the two layout methods may be possible. As a result, it is possible to be compared and analyzed for each layout method. According to the present invention, each facility layout method is simulated by inputting various parameters such as the number of processing modules, a processing time, and the like for each facility type in a limited space in the FAB, thereby confirming the production and spatial efficiency according to each layout method through the simulation.

FIGS. 3 to 8 are diagrams illustrating a result shown by performing a simulation through a computer system capable of performing a semiconductor facility layout simulation or a non-transitory computer readable medium according to an exemplary embodiment of the present invention.

The abbreviations derived from the simulation results of FIGS. 3 to 8 are meant as follows.

UPEH means a unit per equipment hour. WPD refers to a wafer production per day. WPPS refers to a wafer production per day to space and price. A price ratio sets specific facility price to reference 1 and writes the remaining facility price as a ratio. According to an exemplary embodiment, in the case of 98%, the price ratio may be shown as 0.98 and in the case of 150%, the price ratio may be shown as 1.5.

Figure 3:
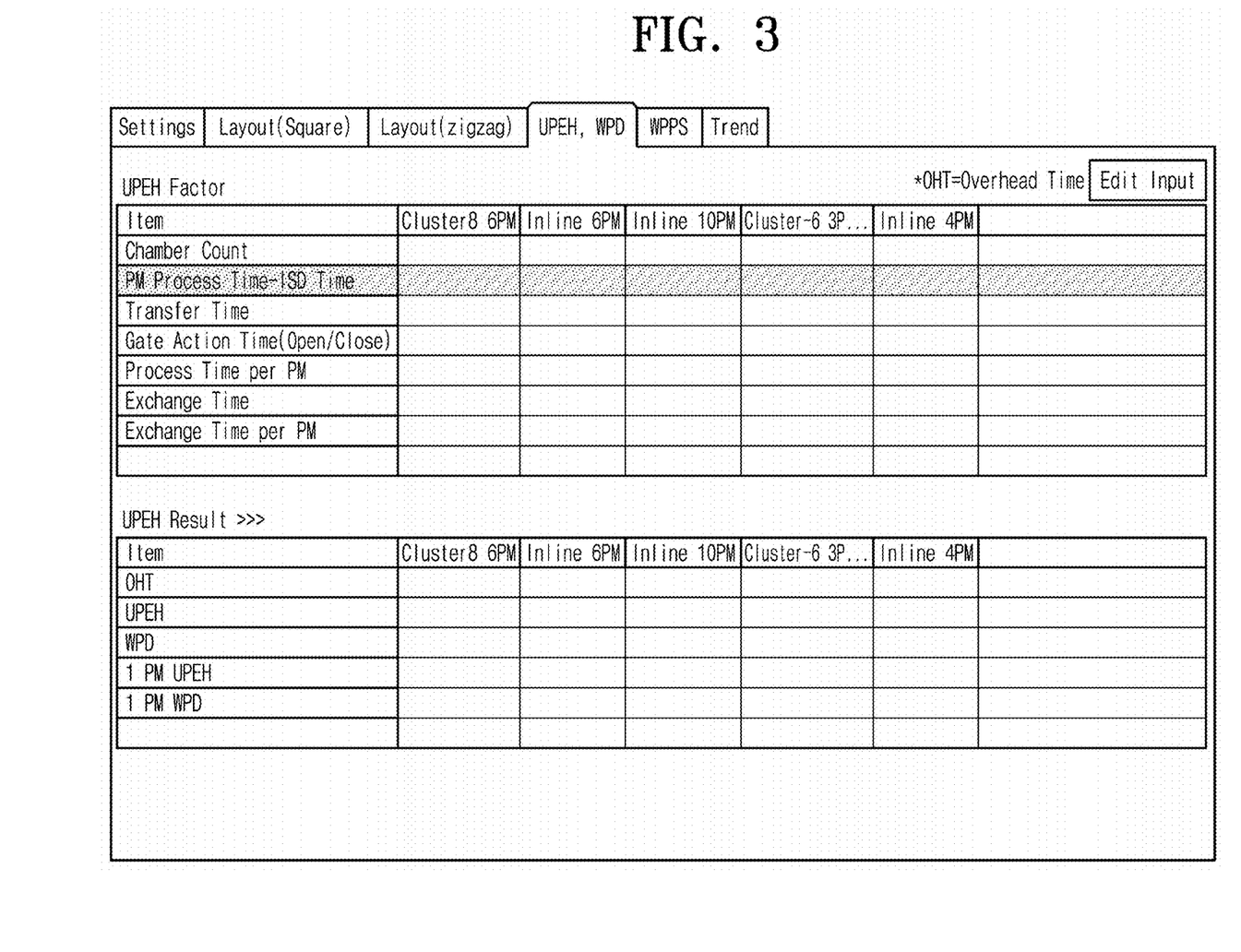
FIGS. 3 to 8 are diagrams illustrating a result shown by performing a simulation through a computer system capable of performing a semiconductor facility layout simulation or a non-transitory computer readable medium according to an exemplary embodiment of the present invention.

According to FIG. 3, there is an effect of confirming the unit per equipment hour (UPEH) and the wafer production per day (WPD) for each PM. The result according to FIG. 3 may be a result of either the first layout method or the second layout method. FIG. 3 illustrates that the user may obtain the wafer production according to a set layout method in a table form. According to FIG. 3, the wafer production per day (WPD) and the unit per equipment hour (UPEH) of the semiconductor facility may be automatically calculated and compared by receiving a size, a processing time, a transmission time, and the like for each facility type.

Figure 4:
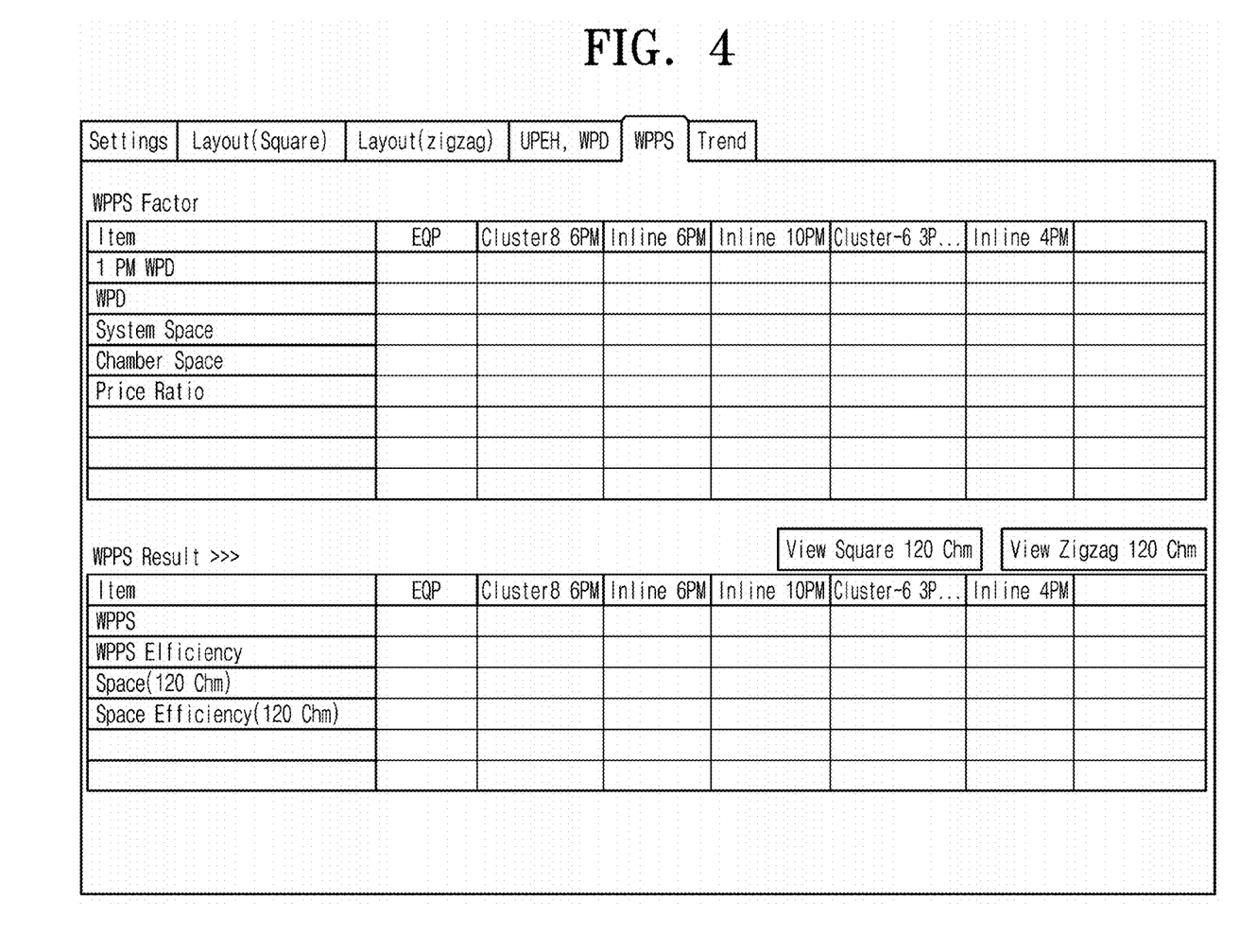

According to FIG. 4, there is an effect of confirming the wafer production to price and space (WPPS) for each PM. According to FIG. 4, there is an effect of calculating WPPS values by inputting various values such as a size of the chamber, a price ratio, a system size, and the like and confirming the calculated WPPS values in a table form.

Figure 5:
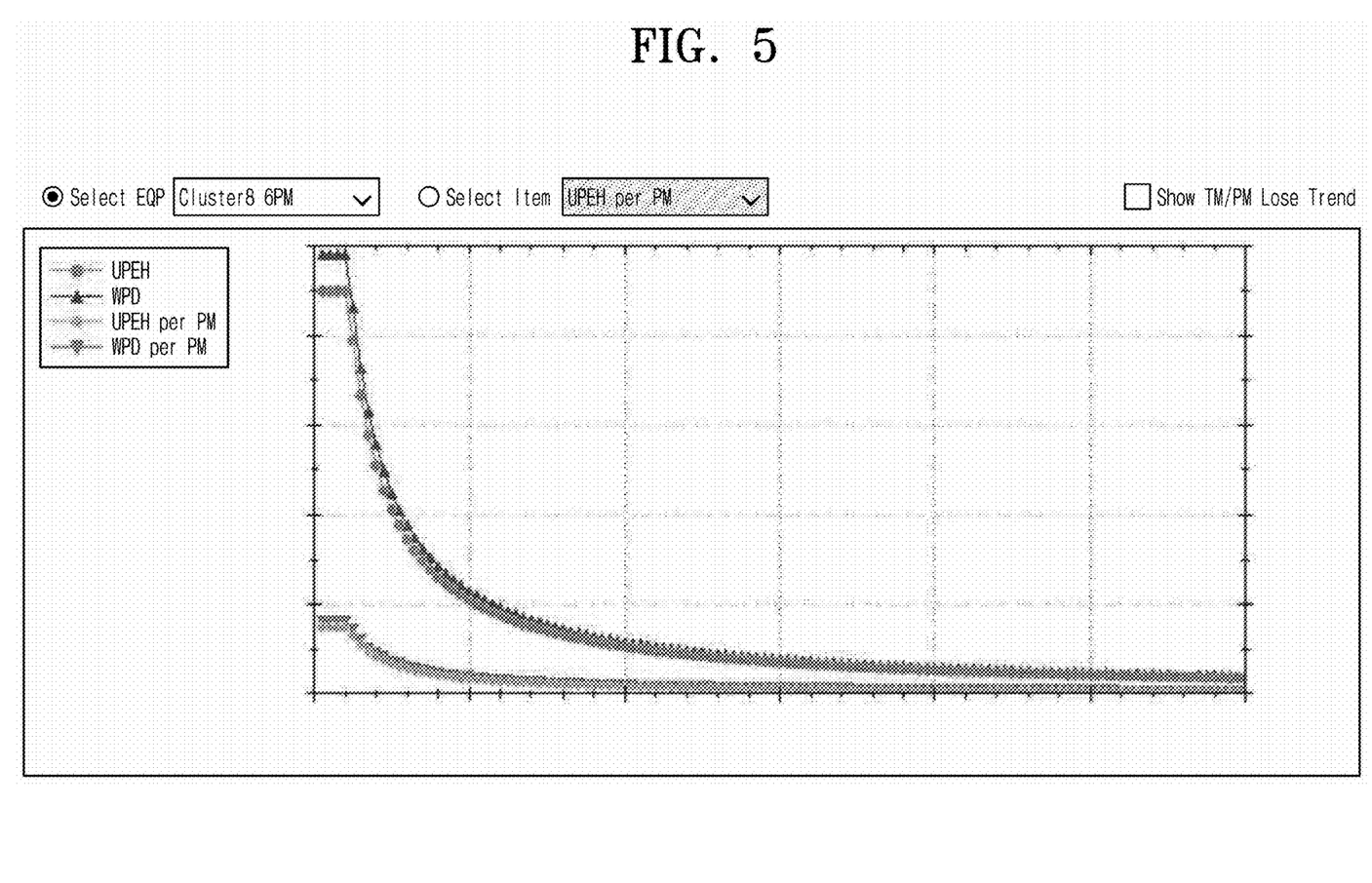

Referring to FIG. 5, the unit per equipment hour (UPEH), the wafer production per day (WPD), the unit per equipment hour per processing module (UPEH per PM), and the wafer production per day per processing module (WPD per PM) may be shown in a graph form according to each processing time. As a result, there is an effect of verifying the tendency of the production according to a processing time. As a result, it is possible to analyze visualized data. According to an exemplary embodiment, the specific numerical values may be confirmed by representing the table form. In the table form, it is possible to compare and analyze the data of values of items according to a change in processing time through a table.

Referring to FIG. 5, an example of a case of confirming the production only in the corresponding facility model selected based on a specific facility model is illustrated. In the case of such an example, the tendency of UPEH/WPD and UPEH/WPD per 1 PM according to a change in processing time of the selected facility model may be analyzed.

Figure 6:
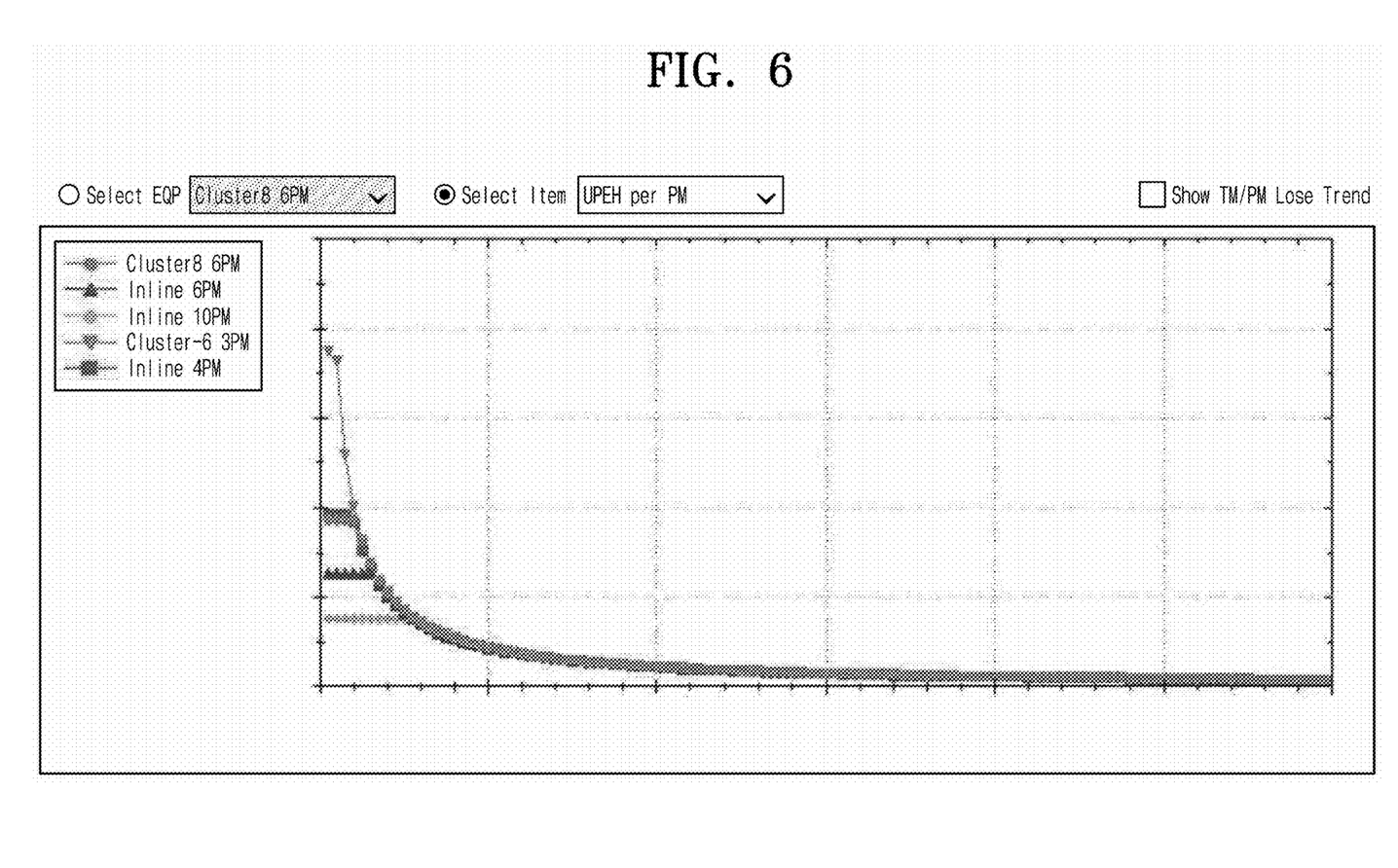

Referring to FIG. 6, an example of confirming a change in production for each PM selected based on the production is illustrated. According to FIG. 6, it may be confirmed that the facility model is selected based on the unit per equipment hour per processing module (UPEH per PM). In the case of such an example, it is possible to compare and analyze selection item values for each facility model according to a change in processing time of the selected production.

Figure 7:
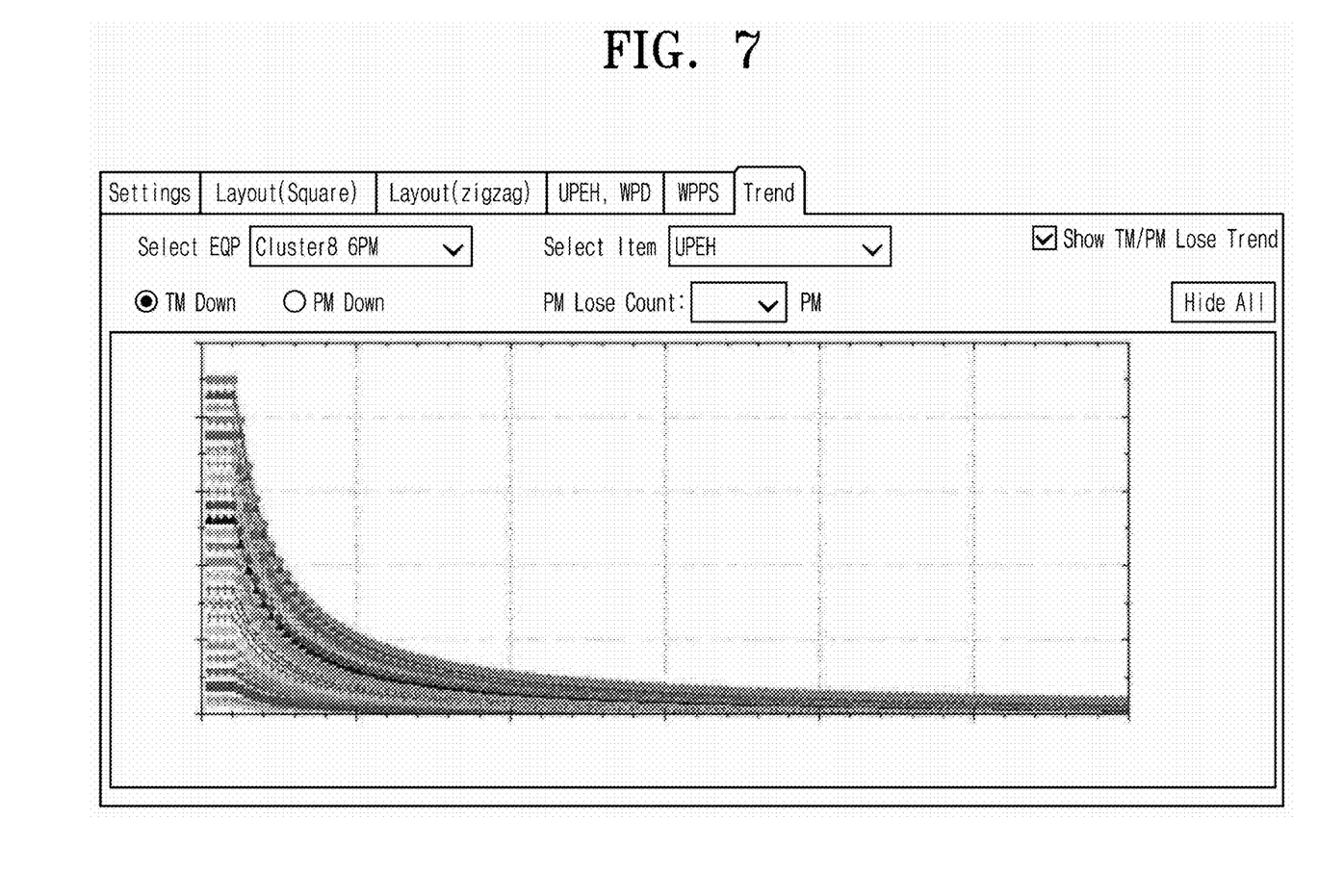

Referring to FIG. 7, an example of selecting a case of a transfer module (TM) down is illustrated.

Referring to FIG. 7, at the time of a normal progress and a TM down for 1 hour to 23 hours, it is possible to analyze the tendency of the UPEH/WPD value according to a change in processing time in the selected facility model.

Figure 8:
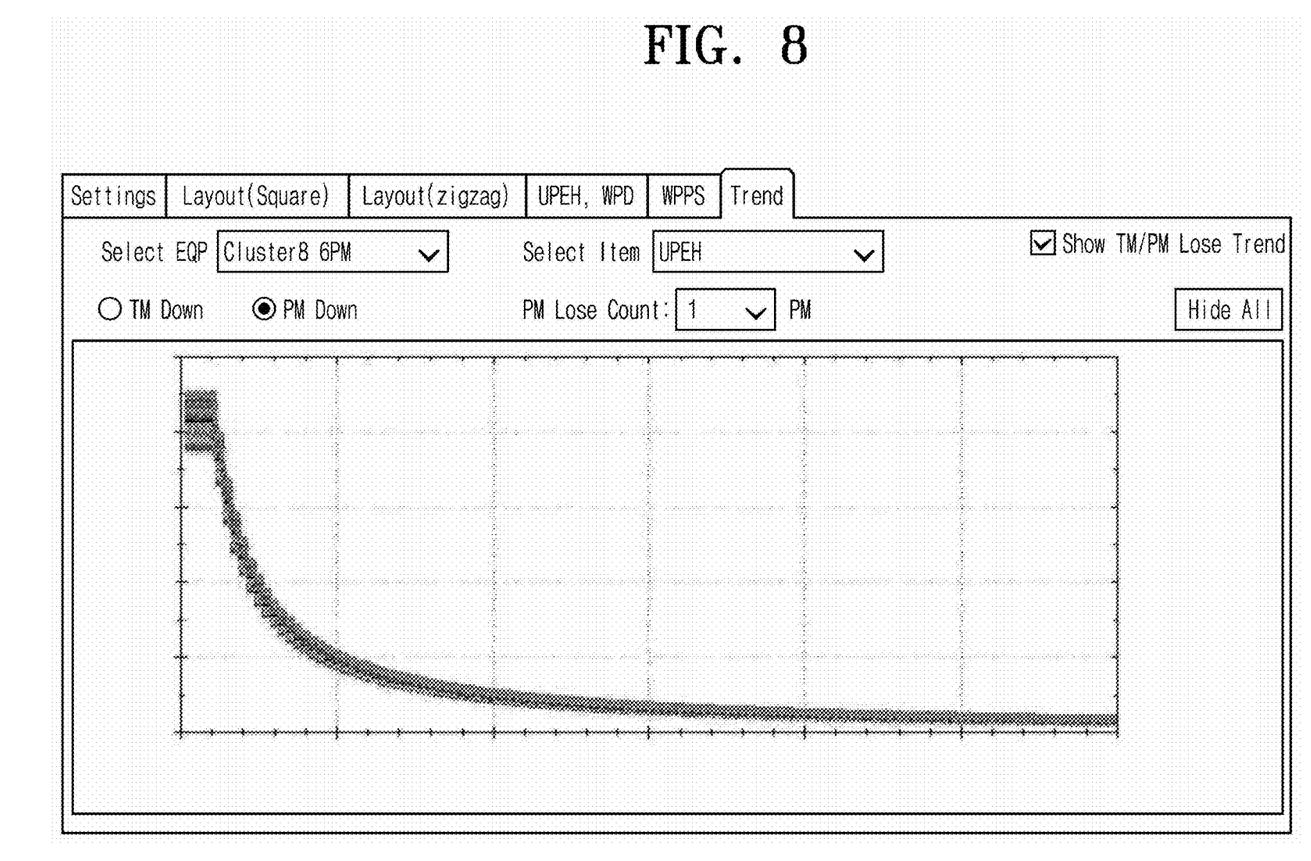

Referring to FIG. 8, an example of selecting a case of a processing module (PM) down is illustrated. In the case of the PM down, the number of lost wafers may be selected and input.

Referring to FIG. 8, at the time of a normal progress and when the number of PMs selected for 1 hour to 23 hours is down, it is possible to analyze the tendency of the UPEH/WPD value according to a change in processing time in the selected facility model.

According to the present invention, it is possible to simulate the facility layout by various methods according to the number of processing modules, a processing time, etc. for each facility type in a specific space of the semiconductor FAB to confirm a production and space and price efficiency according to each layout through the simulation. Further, in the TM down or the PM down, the down time and the number of down modules are received, and as a result, the analysis of production change may also be possible.

According to the semiconductor facility layout simulation system according to the present invention, the layout method may be used as images to support a preview. Further, It is possible to support the view of the maximum layout PM number and the PM chamber number, change the size for each space or facility type, and perform simulation under various conditions.

According to an exemplary embodiment, by simultaneously comparing when the specific PM number is laid out in a specific FAB space and when the maximum PM number is laid out in the specific FAB space, a designer may simply confirm the productivity according to a space layout to help in determining the space efficiency according to a layout.

According to the present invention, it is possible to automatically calculate the wafer production per day (WPD), the unit per equipment hour (UPEH), and the production per day and the production per hour for each PM. Further, according to the present invention, it is possible to compare the production for each facility type. Further, when determining the comparing result, it is possible to change and control a processing time, a transfer time, and the like.

Figure 9:
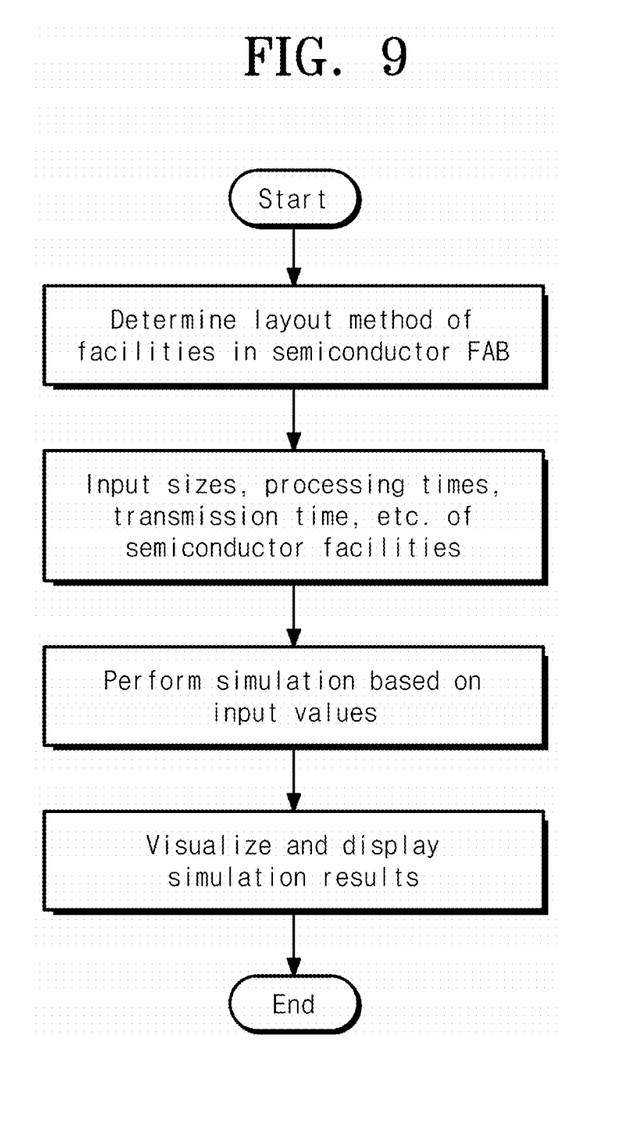
FIG. 9 is a flowchart illustrating a semiconductor facility layout simulation method according to an exemplary embodiment of the present invention.

FIG. 9 is a flowchart illustrating a semiconductor facility layout simulation method according to an exemplary embodiment of the present invention.

According to FIG. 9, a method of performing a semiconductor facility layout simulation using the semiconductor facility layout simulation system according to the present invention may determine a layout method of facilities disposed in the semiconductor FAB. The layout method determined at this time may be either a first layout method as a linear layout method or a second layout method as a zigzag layout method. After the layout method is determined, values of sizes, processing times, transmission times, etc. of the facilities disposed in the semiconductor FAB may be input. At this time, the size of the semiconductor FAB may be input together. Thereafter, the simulation may be performed by considering the input values and the layout method together. Thereafter, the result of performing the simulation may be visualized and displayed. At this time, it is possible to visualize and display the result of the production per day or the production per hour of the facilities disposed in the semiconductor FAB. According to another exemplary embodiment, a result of comparing the production to space and price of the semiconductor FAB may also be visualized and displayed. According to yet another exemplary embodiment, the result of the production per day or the production per hour of the facilities in a down situation of the transfer modules or the processing modules in the semiconductor facilities may be visualized and displayed.

According to the present invention, it is possible to easily determine a suitable layout method by proposing the system and the method capable of being imaged or compared when the facilities are laid out by the two layout methods for each facility type in a specific semiconductor FAB space and confirming the efficiency according to each layout method and conditions of the facilities.

It is to be understood that the exemplary embodiments are presented to assist in understanding of the present invention, and the scope of the present invention is not limited, and various modified exemplary embodiments thereof are included in the scope of the present invention. The drawings provided in the present invention are only illustrative of an optimal exemplary embodiment of the present invention. The technical protection scope of the present invention should be determined by the technical idea of the appended claims, and it should be understood that the technical protective scope of the present invention is not limited to the literary disclosure itself in the appended claims, but the technical value is substantially affected on the equivalent scope of the invention.

What is claimed is:

1. A computer system comprising:
    a processor; and
    a memory storing a program code executable by the processor,
    wherein the processor is configured to:
    place a plurality of facilities in a semiconductor FAB using a first layout and a second layout;
    simulate the first layout and the second layout to obtain a first result and a second result, respectively; and
    compare the first result and the second result through at least one parameter,
    wherein the first layout is a layout in which the plurality of facilities are arranged along opposite sides of a passage in the semiconductor FAB so that the plurality of facilities face each other,
    wherein the second layout is a layout in which the plurality of facilities are arranged in a zigzag form without a space in the semiconductor FAB,
    wherein the processor is configured to simulate the first layout and the second layout by receiving a size of the semiconductor FAB,
    wherein the processor compares the first result and the second result using a production per day of the plurality of facilities disposed in the semiconductor FAB or a production per hour of the plurality of facilities disposed in the semiconductor FAB, and
    wherein the processor compares the first result and the second result using a production per day the plurality of facilities in a down situation of transfer modules or processing modules in the plurality of facilities disposed in the semiconductor FAB or a production per hour of the plurality of facilities in a down situation of transfer modules or processing modules in the plurality of facilities disposed in the semiconductor FAB.

2. The computer system of claim 1, wherein the processor is configured to simulate the first layout and the second layout by at least one of receiving sizes of the plurality of facilities disposed in the semiconductor FAB, processing times of the plurality of facilities disposed in the semiconductor FAB, and transmission times of the plurality of facilities disposed in the semiconductor FAB.

3. The computer system of claim 1,
    wherein the processor further compares the first result and the second result using a production to space and price of the semiconductor FAB.

4. The computer system of claim 1,
    wherein the processor performs to visualize the production per day or the production per hour according to a change in processing time through a chart or table.

5. A non-transitory computer readable medium for storing a program code executable by a processor,
    wherein the processor performs steps of
    placing a plurality of facilities in a semiconductor FAB using a first layout and a second layout;
    simulating the first layout and the second layout to obtain a first result and a second result, respectively; and
    comparing the first result and the second result through at least one parameter,
    wherein the first layout is a layout in which the plurality of facilities are arranged along opposite sides of a passage in the semiconductor FAB so that the plurality of facilities face each other,
    wherein the second layout is a layout in which the plurality of facilities are arranged in a zigzag form without a space in the semiconductor FAB,
    wherein the processor performs to simulate the first layout and the second layout by receiving a size of the semiconductor FAB,
    wherein the processor compares the first result and the second result using a production per day of the plurality of facilities disposed in the semiconductor FAB or a production per hour of the facilities disposed in the semiconductor FAB, and
    wherein the processor compares the first result and the second result using a production per day the plurality of facilities in a down situation of transfer modules or processing modules in the plurality of facilities disposed in the semiconductor FAB or a production per hour of the plurality of facilities in a down situation of transfer modules or processing modules in the plurality of facilities disposed in the semiconductor FAB.

6. The non-transitory computer readable medium of claim 5,
    wherein the processor performs to simulate the first layout and the second layout by at least one of receiving sizes of the plurality of facilities disposed in the semiconductor FAB, processing times of the plurality of facilities disposed in the semiconductor FAB, and transmission times of the plurality of facilities disposed in the semiconductor FAB.

7. The non-transitory computer readable medium of claim 5,
    wherein the processor compares the first result and the second result using a production to space and price of the semiconductor FAB.

8. The non-transitory computer readable medium of claim 5,
    wherein the processor performs to visualize the production per day or the production per hour according to a change in processing time through a chart or table.

* * * * *